C. H. Smith,

Tatting Shuttle.

No. 106,415.　　　　　　Patented Aug. 16, 1870.

Witnesses,
Geo. D. Walker.
Geo. T. Pinckney.

Chas. H. Smith

United States Patent Office.

CHARLES H. SMITH, OF BROOKLYN, NEW YORK, ASSIGNOR TO HIMSELF AND THEODORE D. DAY, OF BERGEN POINT, NEW JERSEY.

Letters Patent No. 106,415, dated August 16, 1870.

IMPROVED TATTING-SHUTTLE.

The Schedule referred to in these Letters Patent and making part of the same

*To all whom it may concern:*

Be it known that I, CHARLES H. SMITH, of Brooklyn, in the county of Kings and State of New York, have invented a certain new and useful Improvement in Tatting-Shuttles; and the following is hereby declared to be a correct description thereof.

The tatting-shuttle in general use consists of a block or spool, upon which the thread is wound, placed between and permanently connected to two shells, that compose the case of the shuttle. The operation of winding this shuttle is very tedious and very fatiguing to the fingers, as the shuttle has to be revolved by the fingers of one hand, while the thread is guided with the other hand.

My improvement relates to forming the shuttle so that one of the shells can be removed, to give access to the spool upon which the material is wound, and allow of the winding of said spool in an easy and expeditious manner.

In the drawing—

$a$ and $b$ represent the two shells composing the shuttle-case, and these are to be of the desired material, and of suitable size and shape.

The block $c$ forms part of, or is permanently connected to, one of the shells $a$ or $b$. I have shown it as connected to the shell $a$; and this block is to be provided with a recess, to receive the spring or catch $e$ upon the shell $b$, by which the two shells are connected or held together.

Figure 1:
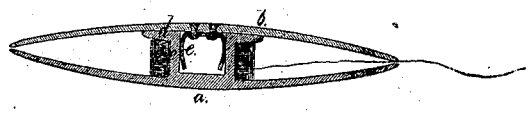
Figure 1 is a vertical longitudinal section of my improved tatting-shuttle.
Figure 2:
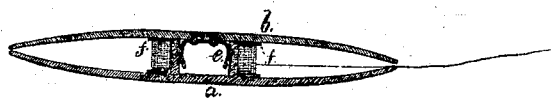
Figure 2 is a similar view of a modification of the same.
Figure 3:
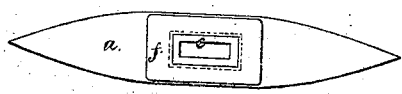
Figure 3 is a plan of one of the shuttle-shells with its block and spool, said plan being of the parts shown in fig. 2.

By providing a flange, $d$, upon the block $c$, as shown in fig. 1, said block becomes a spool, upon which the thread or other material may be wound; or, if preferred, the block $c$ may be made, as shown in figs. 2 and 3, without the flange, to allow of a removable spool, $f$, being placed upon the block. This spool may be removed from the block, and the thread wound upon the same in a manner similar to the winding of an ordinary spool by hand, or said spool $f$ may be wound, while upon the block $c$, the same as winding the spool or block $c$, shown in fig. 1, the shell $a$ being held in one hand, while the material is wound upon the spool, $f$ or $c$, with the other hand.

When the spool $c$ or $f$ is wound, the shell $b$ is to be replaced or connected to the block $c$, which is done by simply placing the spring or catch in its recess $e$, and pressing the shells toward each other.

Both shells might be removable, each shell being provided with a catch or fastening, to connect with the block or spool $c$.

I claim as my invention—

A tatting-shuttle, provided with the removable side or shell, for the purposes set forth.

Signed by me this 25th day of June, A. D. 1870.

CHAS. H. SMITH.

Witnesses:
GEO. D. WALKER,
GEO. T. PINCKNEY.